United States Patent [19]

Hoffmann

[11] 4,416,714

[45] Nov. 22, 1983

[54] LABELING MACHINE FOR HEAT SHRINK LABELS

[75] Inventor: Wolfgang Hoffmann, Modesto, Calif.

[73] Assignee: B & H Manufacturing Company, Inc., Ceres, Calif.

[21] Appl. No.: 471,655

[22] Filed: Mar. 3, 1983

Related U.S. Application Data

[63] Continuation-in-part of Ser. No. 382,374, May 27, 1982, and a continuation-in-part of Ser. No. 438,386, Nov. 1, 1982.

[51] Int. Cl.$^3$ .................. B29C 27/00; B32B 31/00
[52] U.S. Cl. ................................ 156/86; 156/212; 156/215; 156/446; 156/447; 156/448; 156/458
[58] Field of Search .............. 156/84, 86, 212, 215, 156/446, 447, 448, 456, 457, 458, 294

[56] References Cited

U.S. PATENT DOCUMENTS

| | | | |
|---|---|---|---|
| 3,765,991 | 10/1973 | Hoffman | 156/230 |
| 3,822,459 | 7/1974 | Amberg et al. | 29/800 |
| 3,967,995 | 7/1976 | Fabianic | 156/215 |
| 4,014,724 | 3/1977 | Rausing | 156/86 |
| 4,048,281 | 9/1977 | Brummett et al. | 156/86 |
| 4,072,553 | 2/1978 | Braker et al. | 156/86 |
| 4,108,709 | 8/1978 | Hoffman | 156/458 |
| 4,108,710 | 8/1978 | Hoffman | 156/458 |
| 4,199,851 | 4/1980 | Doherty | 156/294 |

Primary Examiner—Edward C. Kimlin
Assistant Examiner—Timothy W. Heitbrink
Attorney, Agent, or Firm—Edward B. Gregg

[57] ABSTRACT

A machine and method for applying heat shrink labels or the like to articles such as containers having cylindrical body portions and an end portion or portions adjoining the body portion and sloping inwardly therefrom. The label has a length such that its leading end overlaps the trailing end and a seam is formed at the overlap. The label is secured to the article by adhesive between the leading end and the container and by adhesive between the overlapping leading end and trailing end. The label is of a width such that it projects beyond the junction or junctions of the end portion or portions with the body portion, resulting in free standing edge or edges which are then heat shrunk onto the container by heat from an external source. A tongue is interposed between the heat source and the seam at each free standing edges or edges. This tongue serves as a heat shield to moderate application of heat to the seam. Most advantageously the end of each tongue is wedge shaped so that as it is extended it acts as a wedge to urge the free standing edge toward the article. In a preferred embodiment of the invention heat is applied in the form of hot air in stages such that the free standing edge or edges are shrunk commencing with their junctions with the container and progressing to the outer edges whereby no air is entrapped.

17 Claims, 26 Drawing Figures

LABELING MACHINE FOR HEAT SHRINK LABELS

This application is a continuation-in-part of my co-pending applications Ser. No. 382,374, filed May 21, 1982, entitled "SYSTEM FOR APPLYING HEAT SHRINK FILM TO CONTAINERS AND OTHER ARTICLES AND HEAT SHRINKING THE SAME" and Ser. No. 438,386, filed Nov. 1, 1982, entitled "SYSTEM AND APPARATUS FOR APPLYING HEAT SHRINK FILM TO CONTAINERS AND OTHER ARTICLES AND HEAT SHRINKING THE SAME".

This invention relates to method and apparatus and to a system for applying heat shrink film to containers and other articles and also to the end product. By "film" is meant material in sheet form, preferably in the form of a roll from which segments are cut.

More particularly, this invention relates to applying heat shrink film to cylindrical containers although, as will appear, the invention is also applicable to applying heat shrink film to containers which are not cylindrical in shape and to articles other than containers.

Heretofore apparatus and a method have been provided for applying heat shrink film to cylindrical containers by a series of steps as follows.

1. Heat shrink film is formed into a tube slightly larger in diameter than the container to which it is to be applied. 2. The container is preheated or, if the film application is carried on in conjunction with the manufacture of glass containers, the glass containers can be taken from the glass manufacturing operation while they are still hot or warm.

3. The cylindrical sleeve is placed over the container.

4. The sleeve is then heated to shrink it onto the container.

This procedure is elaborate and expensive. Among its disadvantages are the following.

The film material must be preformed into a cylinder rather than being applied directly from a roll of film material to the containers.

The preformed sleeves, since they are larger in diameter than the containers, must be shrunk in their entirety. This requires more heat for shrinking, both because the entire material of the sleeve must be heat shrunk and because the containers themselves must be heated.

Representative of the method and system referred to above is U.S. Pat. No. 3,822,459, issued July 9, 1974, to Stephen W. Amberg et al, and assigned to Owens-Illinois, Inc.

It is an object of the present invention to provide improvements in the application of sleeves, labels, jackets or the like to containers and other articles, such sleeves, labels or jackets being of heat shrink film.

It is a particular object of the invention to provide apparatus and a method whereby heat shrink film material may be severed into suitable lengths continuously from a roll of the same, applied tightly to containers without heat shrinking and with an overlap at one or both ends of the film which is (or are) heat shrunk onto the container.

The above and other objects will be apparent from the ensuing description and the appended claims.

Certain embodiments of the invention are shown by way of example in the drawings, in which:

FIG. 3 is a fragmentary view showing one of the nozzles used for heat shrinking and the manner in which it is blocked at the point where a seam on a heat shrunk label passes by;

FIGS. 9A and 9B are similar to FIGS. 8A and 8B, respectively, but show a different stage of operation; FIG. 9B is taken at 9B—9B of FIG. 5 and it shows the leading end of the label in cross section;

FIG. 10 is a view similar to FIG. 9B but downstream from the stage of operation shown in FIG. 9B. FIG. 10 shows the machine at the point of glueing the trailing end of the label to the leading end at station E;

FIG. 14A is a diagrammatic view showing an alternative arrangement of the tongue shown in FIGS. 7 and 8A through 10, such being an improvement upon the construction of FIGS. 7 through 10. In FIG. 14A the tongues are shown in retracted position after film has been applied to a container and before the commencement of heat shrinking;

It will be understood that not only labels but also protective sleeves and jackets may be heat shrunk onto containers and other articles and that the containers or other articles need not be cylindrical.

The invention will be described first with reference to FIGS. 1 through 13.

Figure 1:
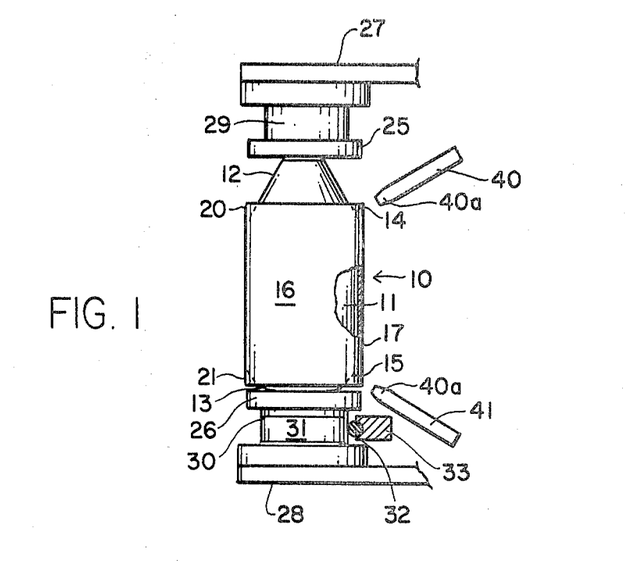
FIG. 1 is a view in side elevation of a pair of chucks mounted on a turret and clamping a cylindrical container onto which a heat shrinkable film is to be shrunk.

Referring now to FIG. 1, a typical cylindrical container is shown and is designated by the reference numeral 10. It comprises a cylindrical body 11, an upper conical shoulder 12, a rounded bottom 13, a shoulder section 14 adjoining the cylindrical body 11 and a section 15 of the rounded bottom 13 adjoining the cylindrical body 11. The container 10 may be of glass, metal or plastic, and it is shown as having a heat shrink film 16 applied thereto. The main body portion of this film, indicated by the reference numeral 17 and constituting typically about 80% of the entire film, is tightly fitted onto the container by a conventional labeling operation such as that shown, for example, in my U.S. Pat. No. 4,108,710. This heat shrinkable film material may be any of a number of materials such as polypropylene, polyethylene, polystyrene foam or polyvinyl chloride. A continuous length of this film material in the form of a roll is provided. (See FIG. 5 and the description below.) It passes continuously through a cutting station where predetermined lengths are severed, the leading end of each severed length is gripped by a vacuum on a constantly rotating vacuum drum and adhesive is applied to the leading end and the trailing end of each label. As shown in my U.S. Pat. No. 4,108,710, a glue line may be applied to the container, the leading end of each label is unglued and is adhered to the container by means of the glue line on the container, and the trailing end of each label is provided with glue and laps over the leading end of the label on the container to form a seam. Preferably, however, as explained in connection with FIG. 5 below, glue is applied to both the leading and trailing ends of the label.

It will thus be apparent that the lengths of film are applied to containers by a continuous method as in conventional labeling with, however, the following important differences. A non-heat shrink material such as a paper label would be applied only to the cylindrical part of the container, that is to say, it would not extend over the curved sections 14 and 15 and would be confined to the cylindrical part of the container. In accordance with the present invention, the film or label 16 is not so confined. Instead it projects slightly above and slightly below, e.g. ¼ inch, the cylindrical body 11 of the container such that it overlaps the sections 14 and 15 of the shoulder and rounded bottom. If the container or other article to be wrapped has a curvature (i.e. it departs from a cylindrical shape) at only one end, then the film will overlap only that end. In the following description and in the drawings it will be assumed that a container is being wrapped which has a rounded bottom and a conical shoulder and that the film will overlap at both the top edge and the bottom edge. The overlap or overlaps are not attached to the container and stand free. It will be understood that articles other than containers may be labeled or jacketed.

The upper overlap is indicated by the reference numeral 20 and the lower overlap is indicated by the reference numeral 21. These overlaps have an important role in the invention as will be explained below.

Also shown in FIG. 1 are upper and lower arms or spokes 27 and 28, respectively, of a turret such as the turret shown in my U.S. Pat. No. 4,108,710 whose function is to transport containers from a container supply through a label applying station and beyond so that labels applied and adhered to the containers by means of glue are wrapped around the containers. An upper chuck 25 and a lower chuck 26 are shown, the upper chuck 25 being rotatably mounted on the upper arm 27 by means of a shaft 29, and the lower chuck 26 being rotatably mounted on the lower arm 28 as by means of a shaft 30. Means are provided such as shown in FIG. 2 of my U.S. Pat. No. 4,108,709 for lifting the upper chuck 25 and holding it in elevated position for entry of a container and for then lowering the chuck 25 to clamp the container between the upper and lower chucks. Further, the lower chuck 26 is positively driven by engagement of a collar 31 on the shaft 30 with a circular, compressible friction member 32 carried by an arcuate holder 33. It will be understood that other means of clamping and spinning containers during transit through the heat shrink station may be employed. A preferred design is described below with reference to FIGS. 7 to 9B.

Also shown in FIG. 1 are two nozzles 40 and 41. The upper nozzle 40 has its tip 40A close to and pointed at the upper overlap 20 of the sleeve 16. The lower nozzle 41 has its tip 40A close to and pointed at the lower overlap 21 of the sleeve 16.

Figure 2:
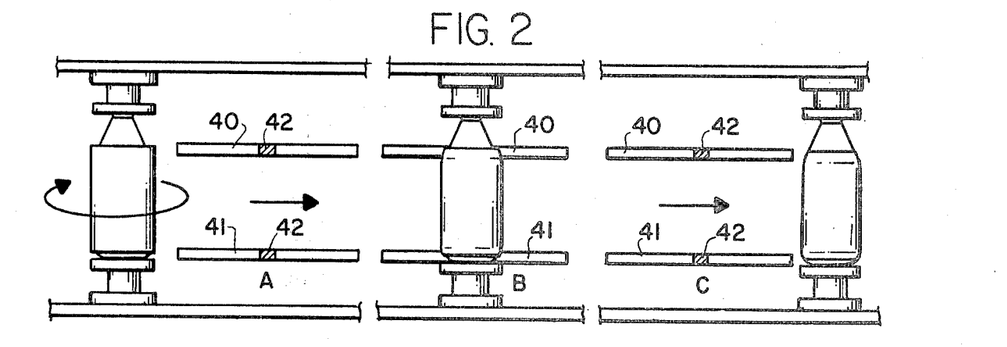
FIG. 2 is a view of these heat shrink stations on a turret.

Referring now to FIG. 2, three sets of upper and lower nozzles 40 and 41 are shown. For convenience these sets appear to be located in a vertical plane, as they may be, but preferably they are located radially with respect to the axis of a turret. As will be seen, the tips of these nozzles are elongated such that, as a container 10 with a sleeve 16 adhered to it passes by and spins about its vertical axis, each portion (with an exception as described below) of the upper overlap 20 and of the lower overlap 21 is exposed to a current of hot air emanating from the nozzles.

The purpose of a plurality of sets of nozzles 40 and 41, e.g. three as in FIG. 2, is as follows: The film material 16 is a relatively limp material. If it is heated too long and too fast, it may deteriorate, undergoing slumping or other distortion of its configuration. Therefore, the heat is delivered in increments at heating stations A, B and C. A portion only of the heat required for shrinking is delivered at station A and the overlaps 20 and 21 undergo a partial but incomplete shrinkage to, for example, the condition shown at station B. At station B a further increment of shrinkage occurs, and at station C the final shrinkage occurs. The overlaps 20 and 21 are shrunk onto the container.

Depending upon the nature and thickness of the film, and possibly upon other factors, it may be possible to accomplish the heat shrinking in one step, in which case there would be one heat shrink station and one pair of nozzles 40 and 41. For higher speed application and/or with different types of film more than three pairs of nozzles may be provided.

Figure 3:
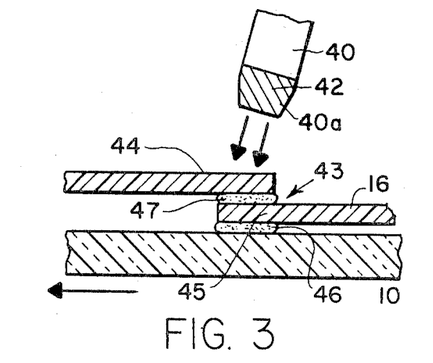
Figure 4:
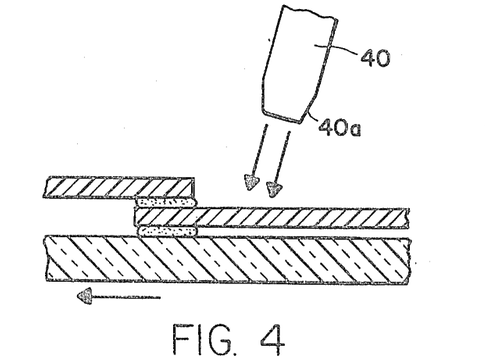
FIG. 4 is a similar view at another point where the side beam has passed by the heat shrink station.

Referring now to FIGS. 2 and 3, each nozzle 40 and 41 is provided with an obstruction 42 at a certain point. (Nozzle 40 is shown in FIGS. 3 and 4 but nozzle 41 is similar.) The obstruction 42 in the upper nozzle 40 is in vertical alignment with the obstruction 42 in the lower nozzle 41. As stated above, the containers are caused to spin by frictional engagement of the collar 31 with the rubber friction member 32. A seam 43 is shown in FIG. 3, such being the place where the trailing end 44 of label 16 overlaps the leading end 45 of the label. The leading end is adhered by a layer of glue 46 to the container 10, and the trailing end 44 is adhered to the leading end 45 of the label by a layer of glue 47. FIG. 3 portrays a point in the path of travel of the container and label where the seam 43 is juxtaposed to the nozzles 40 and 41. If hot air is applied too vigorously to this seam the glue will melt and cause smearing and will result in a defective or unsightly sleeve or label. The function of the plug 42 is to prevent or to moderate the flow of hot air at this point in the travel of the container. Since the container is spun at a predetermined rate and is caused to undergo orbital motion at a predetermined rate, the timing is such that when a container reaches a point opposite an obstruction 42, the seam 42 will be juxtaposed to the obstruction.

This timing can be achieved by means well known in the art. The drive roller which supplies the film, the cutter which severs the film into segments, the vacuum drum which picks up segments of film and transports them to the turret, the turret which transports containers and the means for spinning the chucks 25 and 26 are operated continuously by and are timed by well known means so that each segment of film is properly applied to the vacuum drum, glue is applied to film segment, the container picks up a film segment from the vacuum drum and travels and spins at a predetermined rate such that, among other things, the seam 43 of each film segment or label coincides with a plug or plugs 42.

Referring to FIG. 4, this represents the situation after the seam 43 has passed by. As will be seen, the full current or hot air is applied to the film. The same condition, of course, prevails at all points both before and after the seam reaches the point shown in FIG. 3.

Figure 5:
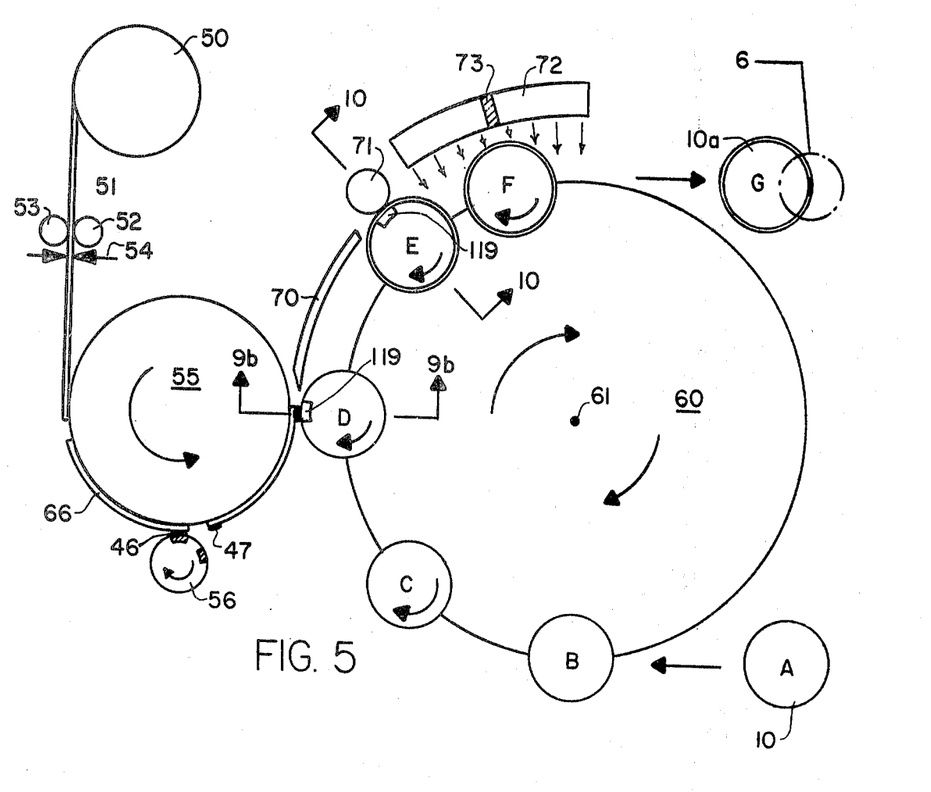
FIG. 5 is a diagrammatic view of a complete system in accordance with the invention.

Referring now to FIG. 5, a complete assembly, such as a labeling assembly, is shown. It comprises a roll 50 of heat shrink film 51 (e.g. label stock), a drive roller 52 and a pinch roller 53, a cutter 54 and a vacuum drum 55. These elements are of known construction and mode of operation. Other elements not shown may be included, e.g. tensioning means for the label stock 51. A glue applicator 56 of known construction is also shown which applies hot melt glue to the leading end and the trailing end of each label.

The glue applicator 56 may be a rotating member which dips into a pot of hot melt glue (not shown) and it may be caused to oscillate as well as rotate in timed relation to the rotation of the vacuum drum 55 to apply a layer of glue 46 to the leading end of each label and a layer of glue 47 to the trailing end of each label. Alternatively the drum 55 may be formed with raised areas which are spaced so that the leading and trailing ends of the label are elevated from the main surface of the drum and are contacted by a glue applicator 56 which rotates but does not oscillate. Both types of glue applicator systems are well known.

Also shown is a turret 60 rotating about an axis 61 which receives containers 10 from a container feed (not shown). The turret 60 is provided with pairs of chucks such as those shown at 25 and 26 in FIG. 1. Each container, in turn, is clamped between a pair of chucks and is transported orbitally about the axis 61 of turret 60 and is caused to spin about its own cylindrical axis. A glue line may be applied to each container such as that shown at 53 in FIG. 1 of my U.S. Pat. No. 4,108,710. However, it is preferred to apply the glue to the leading and trailing ends of the label. It will be understood that the various driven elements are coordinated and synchronized to accomplish the desired results.

Each severed label 66 is gripped by vacuum drum 55 and is rotated counterclockwise as viewed in FIG. 5 past the glue applicator 56 which applies glue to the leading and trailing end of each label. Preferably as described in my U.S. Pat. No. 3,765,991 the leading end of the label stock 51 is gripped by the vacuum drum 55 before a label is severed. Also the drum 55 is rotated at a surface speed greater than the speed at which the label stock is fed by the rollers 52 and 53. The label then proceeds to a labeling station D. The leading end of each label is adhered to the container at which time vacuum is released and the label commences to wrap around the spinning container until the glued trailing end overlaps and is adhered to the leading end of the label. If a partial wrap is to be applied, the glued trailing end will be adhered directly to the container. This wrapping is aided by an arcuate guard and pressure member 70 which is concentric to the container turret 60 and is spaced from the turret axis 61 so that it will restrain the loose end of the label until it is wrapped around the container. The guard 70 may be a brush or made of rubber or other material which does not mar the label. It need not extend above or below the cylindrical body portion of the container. Preferably the guard 70 is formed with a groove or channel (not shown) facing the label and the container which has a width equal to the width of the label. This design ensures that, regardless of irregularities in the containers or other disturbing factors, the leadng and trailing ends 45 and 44 are not misaligned.

Figure 6:
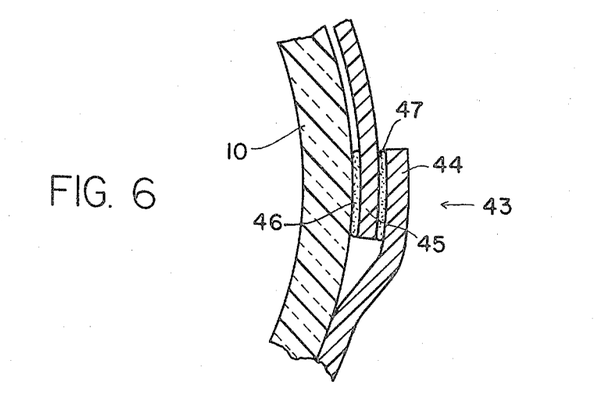
FIG. 6 is a fragmentary cross sectional view on a larger scale taken at the circled area in FIG. 5 of a container and a label showing the seam.

A pressure roller 71 is provided to apply pressure to the seam (which is shown in FIG. 6) so that it is firm and even. This roller may be made of metal, plastic, rubber or other suitable material and it is rotated at a surface speed which is the same as or slightly slower than the surface speed of the container. The use of a slightly slower speed causes a pull or tension which is desirable.

A heating station such as that shown in FIGS. 1 to 4 is shown at 72 including a plug 73. Shrinking of the ends of the labels is accomplished as described above. The heating station 72 should be considered in the light of the description above with reference to FIGS. 1 to 4. That is, there will be a nozzle for the upper overlap 20 and a nozzle for the lower overlap 21 and there may be two or more sets of nozzles. The heating station 72 in FIG. 5 is intended to embrace these variants. Labeled containers 10a are removed by a suitable container out-feed such as a star wheel (not shown).

There are several advantages to the apparatus and system described above, among which are the following: Instead of cutting a supply of heat shrink film into lengths which are greater than needed to wrap a container, forming each length into a tube which is oversize in relation to the container, fitting each tube over a container, then heat shrinking the entire tube onto the container, a continuous supply of label material which can be heat shrunk is provided; it is severed continuously into segments which are long enough only to surround a container with a small overlap; the segments are applied continuously to containers by a standard labeling procedure; and then heat is applied to the overlap or overlaps at one or both ends of the label to heat shrink only the overlapping material. (To distinguish from the leading and trailing ends 45 and 44 (see FIG. 3) the "ends" as referred to above, i.e. the overlap portions such as shown at 20 and 21 will be referred to hereinafter as "edges" or "overlaps".) Besides greater operating efficiency and more economical apparatus, the system described above saves material because oversize tubes are not required and it saves thermal energy because only the edge or edges (a small fraction of the label) need be heat shrunk. Further, since the label is secured to the container by an adhesive material, heat shrinking edge or edges onto the container it not necessary but is useful in that it provides a better appearance. In the prior method wherein an oversize tube is shrunk onto the container, it is necessary to shrink both the top and bottom ends or edges onto the container shoulder and the curvature at the bottom in order to secure the label onto the container. Further, in such prior method it is common to extend the label around the lower end of the container and onto the bottom surface. This is unnecessary with the present invention.

In the preferred embodiment of the invention, which is illustrated in FIGS. 7 to 10, provision is made to facilitate the formation of a good seam at the overlaps 20 and 21 (see FIG. 1). As shown in FIG. 1 and as described above, the overlaps 20 and 21 stand free and they are caused to shrink onto the curved portions 14 and 15, respectively, of the container. In forming the seam shown in FIG. 3, which is designated by the reference numeral 43, pressure is applied at the labeling station D (see FIG. 5) by the label drum 55 and the container 10 and beyond this station by the member 71 and the container 10. This pressure aids in forming a tight seam. Such pressure is absent, however, at the overlaps 20 and 21 because the container slopes away from the label and the label stands free.

In FIGS. 7 to 10 a method and apparatus are illustrated which provide pressure at the overlaps or edges of the label.

Figure 7:
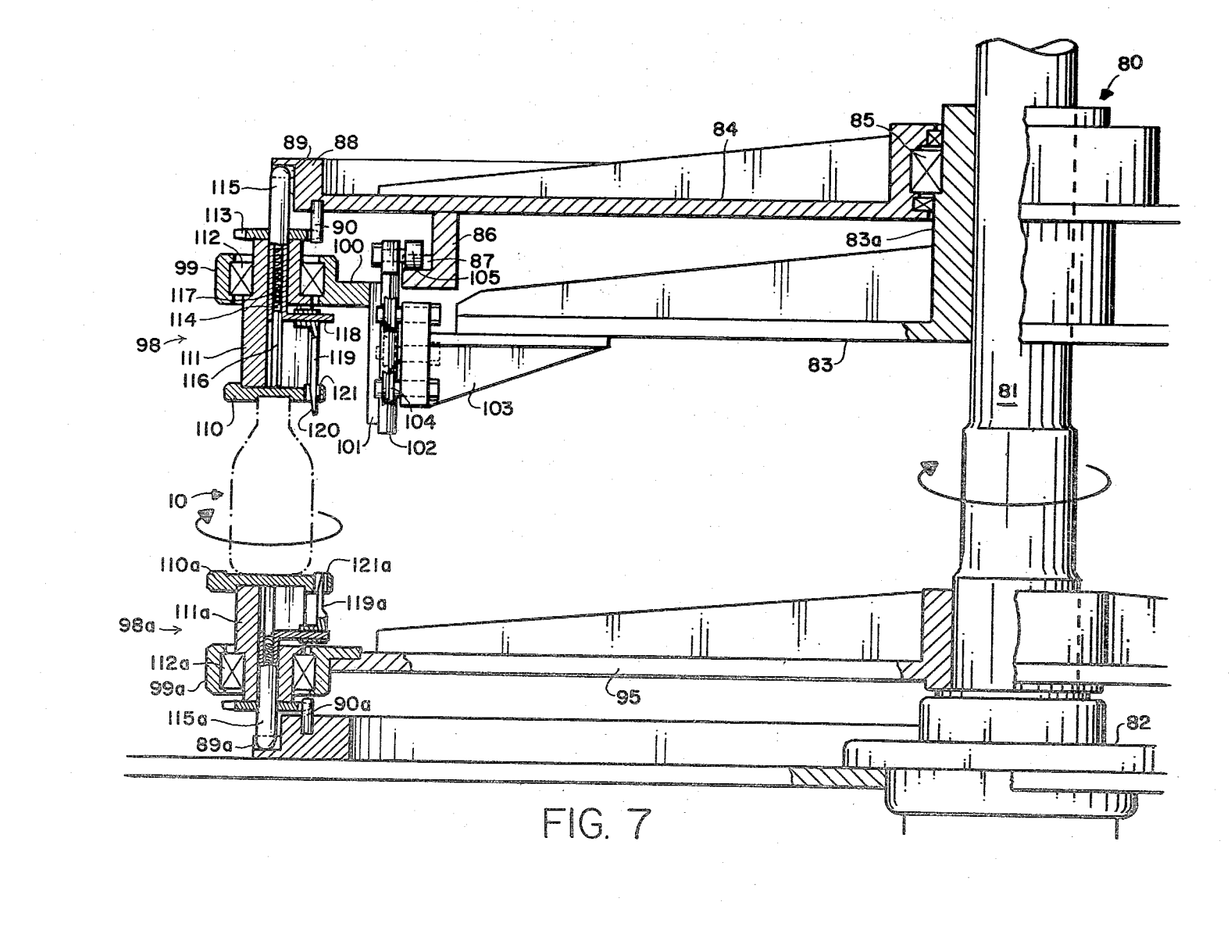
FIG. 7 is a view in vertical section through a container transport turret which is a preferred embodiment of the invention.

Referring now to FIG. 7 a turret assembly is there shown and is generally designated by the reference numeral 80. This is a specific and preferred embodiment of the turret assembly 60 shown in FIG. 5.

A main shaft 81 is shown which is journalled in a frame 82 and mounted to rotate with it are a number of arms or spokes 83 which are integral with a hub 83a which is fixed to the shaft 81 to rotate with it. Rotatably mounted on the hub 83a is a plate 84 which is mounted on hub 83a by means of bearings 85. The plate 84 is fixed by suitable means (not shown) against rotation so that the shaft 81 and parts operated by it may rotate about the axis of the shaft 81 while the plate 84 and parts supported by it are stationary.

The plate 84 supports a bracket 86 which in turn support an arcuate continuous cam 87. At its outer edge the plate 84 is formed with a bracket 88, which supports a continuous arcuate cam 89. The plate 84 also supports pins 90 which form a gear to drive sprockets as described hereinafter. Lower arms 95 are provided which are fixed to and rotates with the shaft 81 and support a cam 89a and pins 90a which are comparable to and serve a similar purpose as the cam 89 and pins 90.

A chuck assembly is provided which includes a collar 99 which is connected by a bracket 100 to a bar 101 which in turn supports a rail 102 of angular cross-section. A bracket 103 connected to the spoke 83 supports rollers 104 which have grooved peripheries which ride upon the rail 102. At its upper end the rail 102 supports a cam follower roller 105 which rides on the cam 87. A chuck 110 is provided which is shaped so that it will fit snugly over the crown of a container 10. This chuck is carried by a hub 111 which forms the inner race for roller bearings 112, the outer race of which is provided by the collar 99. Attached to the upper end of the hub 111 is a sprocket 113 which meshes with the pins 90 and serves to rotate the chuck 110. The hub 111 is hollow, being formed with an axial passage 114 in which a pin 115 having a rounded upper end is slidable. The rounded upper end of the pin 115 bears against the cam 89. A pin 116 extends upwardly from the chuck 110 and a spring 117 lodged within the tubular passage 114 and seated on the pin 116 serves to hold the rounded upper end of the pin 115 at all times against the cam 89.

A bracket 118 is provided which is fixed to the pin 115 and which supports a tongue 119 which extends downwardly and has a tapered tip 120. The tongue passes through an opening 121 in the chuck 110. The taper of the tip 120 conforms to the surface of the container at the junction of the shoulder with the cylindrical body of the container.

A chuck assembly 98a is provided at the bottom and is supported by the plate 95. Parts similar to parts in the chuck assembly 98 are similarly numbered with the addition of the letter "a". The construction and operation will be evident from the description above of the chuck assembly 98 except that there is no cam 87, cam follower 105 and associated parts, the reason being that the lower chuck assembly 98a is not elevated and lowered as is the upper chuck assembly 98.

It will be understood that each pair of arms or spokes 83 and 95 is provided with chuck assemblies 98 and 98a and that as many pairs of arms and chuck assemblies are provided as desired.

It will be apparent that as the shaft 81 rotates each of the chuck assemblies 98 and 98a will rotate orbitally with the shaft 81 about the axis thereof. It will also be apparent as more fully described hereinafter that the upper chuck assembly 98 and with it the chuck 110 are caused periodically to elevate by reason of the cam 87 and the cam follower rollers 105 and the supporting mechanism described above and illustrated in FIG. 7 and that meanwhile the chuck 110 will be caused to rotate about its own axis by reason of the sprocket 113 and pins 90. It will also be apparent that the tongue 119 will undergo periodic elevation (retraction) and lowering (extension) by reason of engagement of the pin 115 with the cam 89. It will similarly be apparent that the lower chuck assembly 98a will rotate orbitally with the shaft 81; that the lower chuck 110a will rotate about its own axis; and that the tongue 119a will undergo periodic elevation (extension) and lowering (retraction).

Referring to FIG. 5 as well as to FIG. 7, the profile of the cam 87 is such that each upper chuck 110 is in elevated position at the station marked B in FIG. 5 where a container enters the turret so as to clear the crown of the container. The container is seated on the lower chuck 110a. Then the cam 87 and the cam roller 105 will cause the bar 101 and bracket 100 to lower thereby contacting the respective chuck 110 with the crown of the container and clamping the container between the upper and lower chucks and causing the container to spin. This driving relationship between the chucks 110 and 110a and the container 10 will continue through the stations indicated as C, D, E and F in FIG. 5 and then the upper chuck 110 will be elevated to free the container which will be extracted by suitable extraction mechanism (not shown) such as, for example, a star wheel.

Adjustments for containers of different heights and different shapes can be readily made. For example hub 83a may be raised or lowered and chucks 110 and 110a may be changed.

Referring now to FIGS. 8A through 9B, these show diagrammatically (and with certain parts shown in FIG. 7 omitted for clarity) the sequence of operations with respect to the tongues 119 and 119a.

Figure 8A:
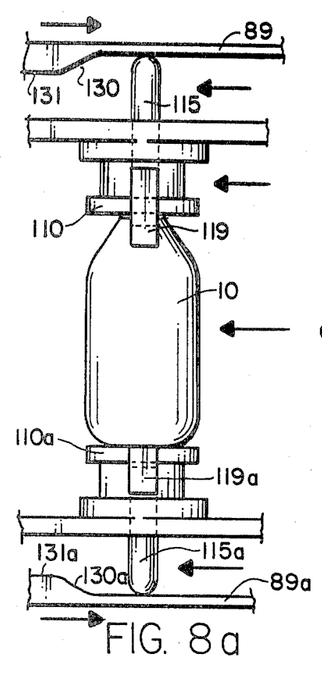
FIG. 8A is a fragmentary view in side elevation of a container between a pair of chucks, such being similar to FIG. 7 but with certain parts omitted for simplicity.
Figure 8B:
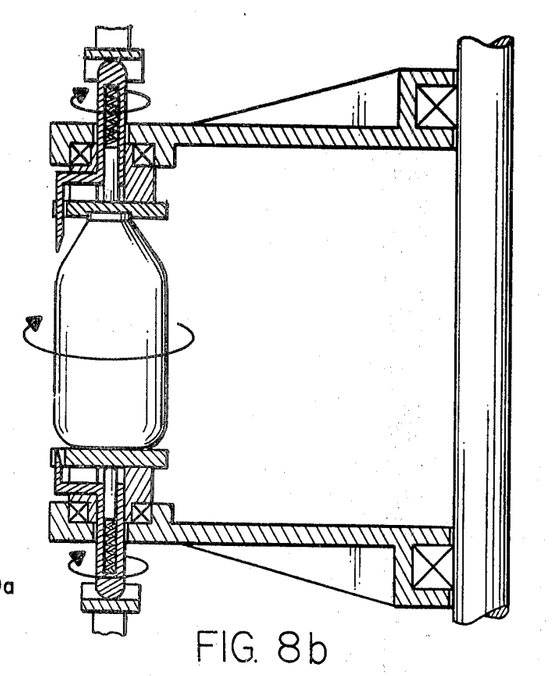
FIG. 8B is a view along the line 8B—8B of FIG. 8A.
Figure 9A:
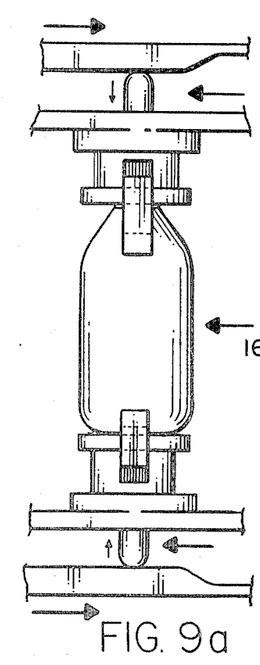
Figure 9B:
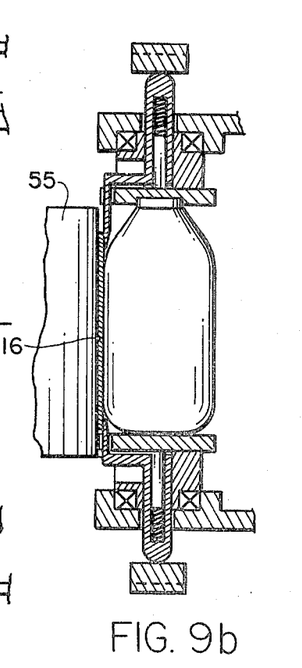
Figure 10:
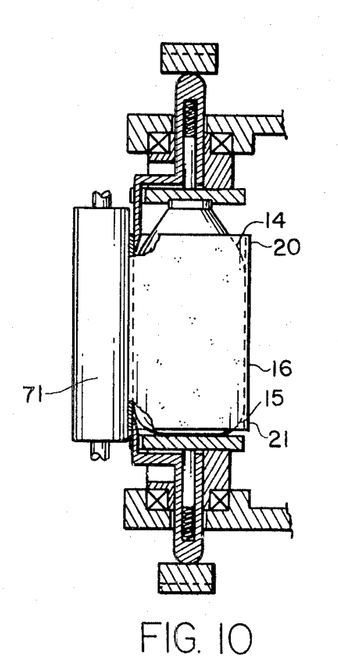

Referring now to FIGS. 8A and 8B the tongues 119 and 119a are shown in their retracted positions as they would be, for example, between stations B and C in FIG. 5. At an appropriate time before the container reaches the labeling station D the tongues will be caused to extend in the following manner: The upper pin 115 which moves the upper tongue 119 travels along the cam 89 and when it reaches the rise portion 130 of the cam it descends and then remain in its lowered position by reason of the dwell 131 of the cam 89. Similarly the lower pin 115a and the lower tongue 119a will be caused to move upwardly by the rise 130a and will be held in elevated position by the dwell portion 131a of cam 89a. The positions of the tongues 119 and 119a in their extended state is shown in FIGS. 9A and 9B. Preferably these tongues are extended before the container reaches the labeling station D and they are in the proper position shown in FIG. 10 to cooperate with the roller 71 at station E to apply pressure to form a good seam at the overlap portions of the label. The ends of the dwell portions of the cams 89 and 89a (not shown) will, of course, operate to retract the pins 115 and 115a and with them the tongues 119 and 119a. This will occur in advance of the hot air applicator 72 at station F so that the overlap seams will shrink upon the container as described hereinabove.

The pressure of tongues 119 and 119a need be provided only at station E where the trailing end 44 is adhesively applied to the leading end 45 by a glue line 47 (see FIGS. 3 and 6). The glue line 46 which adhesively attaches the leading end of the label to the container will not be applied at the edges or overlaps 20 and 21 of the label (see FIG. 1). The timing is such that the seam 43 and the tongues 119 and 119a coincide at the tangent position of the roller 71 and the container 10, at which time the counteracting pressures of the tongue or tongues and the container are provided to form the seam 43 along the height of the label including the free standing end portions 20 and 21.

To prevent fouling of the tongues 119 and 119a, different approaches may be used. For example if glue is applied to the container as in my U.S. Pat. No. 4,108,710 it may be applied only to the cylindrical body of the container. No glue will be applied to the leading end of the label. Glue will be applied to the entire trailing end of the label but will not contact the tongues 119 and 119a. If, as in FIG. 5, glue is applied to the leading end as well as to the trailing end of the label the raised pad (not shown in FIG. 5 but shown in FIGS. 11, 12A and 12B) for the leading end of the label may extend only along the cylindrical body of the container so that a glue line 46 is applied only to that part of the label.

Figure 11:
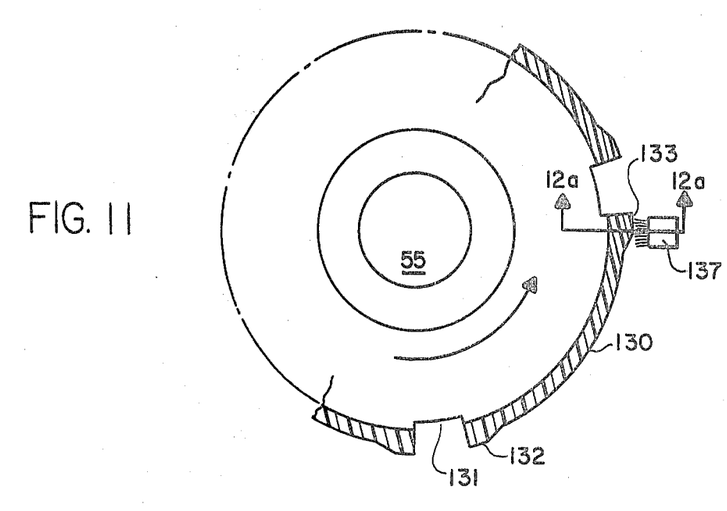
FIG. 11 is a section through the vacuum drum showing one of the pads used to hold the labels.
Figure 12A:
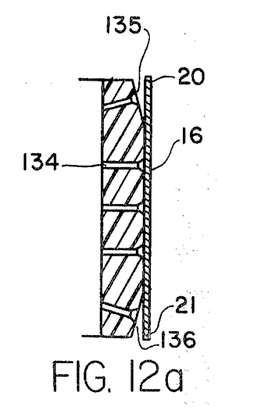
FIG. 12A is a section along the line 12A—12A of FIG. 11.
Figure 12B:
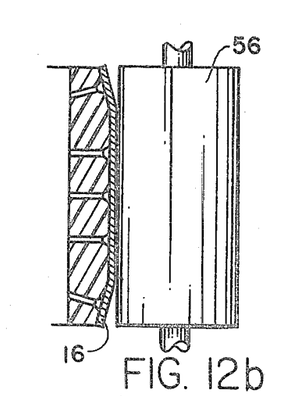
FIG. 12B is a similar section taken at a later stage of operation of the drum.

Another approach to the problem is that shown in FIGS. 11, 12A and 12B. Referring to FIG. 11, the vacuum drum 55 is shown with one of the pads 130 used to pick up and carry the labels from the label receiving station to the label applying station D (see FIG. 5). There may be as many of these pads as desired and they are made of a resilient material such as rubber. Between each pad and the next pad is a recessed area 131 which extends axially along the surface of the drum and each pad is formed at its trailing end wth a raised portion 132 and at its leading end with a raised portion 133 which serve to elevate the trailing and leading end of the label into engagement with the glue applicator 56. As will be seen in FIGS. 12A and 12B, the raised portion 133 is formed with suction passages 134. [The remainder of the pad including the trailing end portion 132 are also provided with suction passages (not shown).] The manner in which suction is applied through the suction passages to pick up a label at the label receiving station and to release it at the label applying station D are well known in the art and require no description here.

As will be seen, the top and bottom parts of the raised portion 133 are tapered at 135 and 136 so that when a label 16 is applied, the top and bottom edges 20 and 21 (see FIG. 1) of the label will overlie the tapered portions 135 and 136. Brushes 137 are provided (one of which is shown) which push gently against the edges 20 and 21 of the label. Other means than brushes may be used for this purpose which do not mar the label material. The edges 20 and 21 are pushed against the tapered portions 135 and 136 and are held against them as shown in FIG. 12B by suction. Therefore glue will be applied only at the mid-portion of the leading end of the label by the glue applicator 56 which is in contact with the cylindrical body of the container. This is sufficient to tack the label onto the container and it avoids fouling of the tongues 119 and 119a. The brushing back of the edges 20 and 21 of the label is carried out before the label reaches the glue applicator 56.

Figure 13:
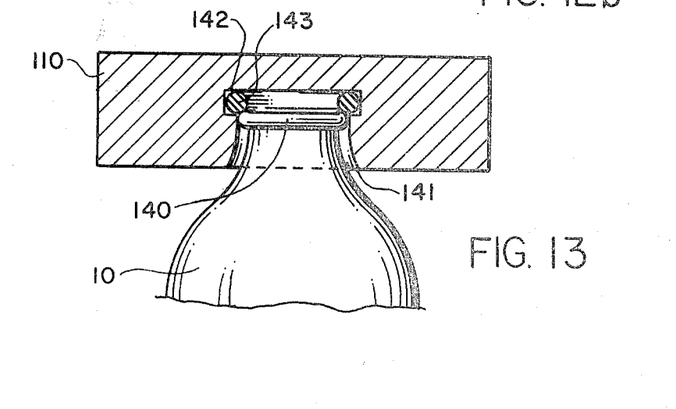
FIG. 13 is a fragmentary view partly in vertical section showing the preferred form of chucks for the crowns of bottles.

Referring now to FIG. 13, a preferred form of upper chuck 110 is provided which is suited to grip the crown 140 of a container 10 such as a bottle. The chuck 110 is formed with a circular opening 141 which tapers upwardly as shown and which opens into a larger area 142 at the top to receive an O-ring 143.

Figure 14A:
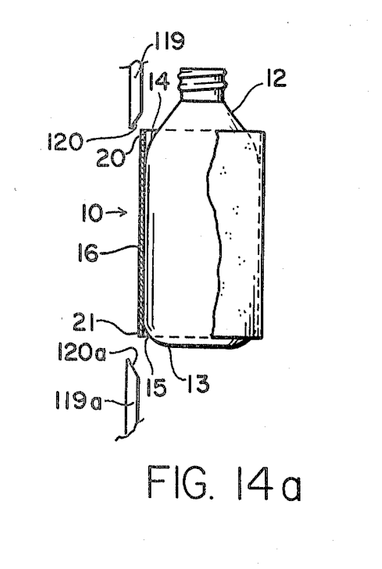
Figure 14B:
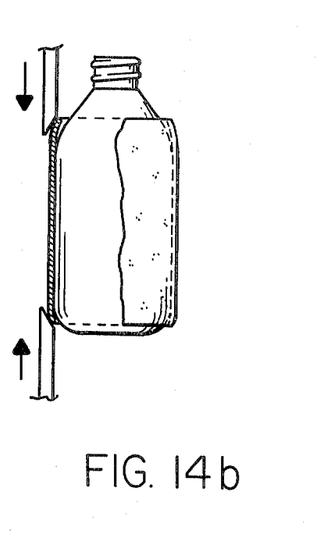
FIG. 14B shows the tongues in the act of approaching the film at about the instant that heat shrinking commences.
Figure 14C:
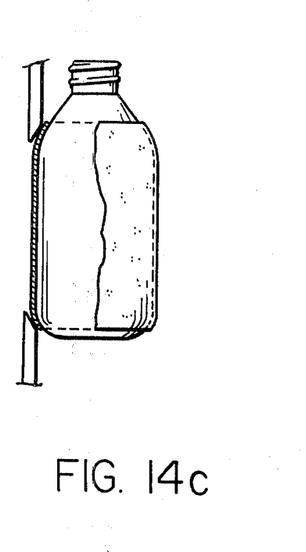
FIG. 14C shows the tongues in fully advanced positions during heat shrinking.

Referring now to FIGS. 14A, 14B and 14C, an improvement upon the placement and functions of the tongues 119 and 119a is shown. Omitted from FIGS. 14A, 14B and 14C are parts such as, for example, the chucks 110 and 110a, the cams 89 and 89a and the hot air nozzles 40 and 41. It is to be understood that all of the operating mechanism described above with reference to FIGS. 1 through 13 is present except for the placement of the tongues 119 and 119a and the absence (as explained below) of the obstructions 42.

In FIG. 14A, a container 10 is shown with a heat shrink (but unshrunken) film 16 applied thereto with projecting end portions 20 and 21. Each tongue 119 and 119a has a beveled portion 120 or 120A, respectively, like the tongues 119 and 119a shown in FIGS. 8A through 10. However each tongue 119, 119a is displaced radially outwardly with respect to the container so that the tips are outside the upper and lower projections of the cylinder formed by the sleeve 16. FIG. 14B shows a later stage in operation at the point where hot air (unimpeded by obstructions 42) commences to be applied. FIG. 14C shows the position of the tongues during the major part (or all) of the heat shrinking process while hot air is being applied and for a short time afterwards.

The tongues 119 and 119a serve as heat barriers to prevent excessive heat being applied to the seams where the leading and trailing ends of the film or label overlap. This seam is shown at 43 in FIG. 6 and although it is not shown in FIGS. 14A, 14B and 14C it will be understood that it is present opposite the tongues 119 and 119a. It has been found that the application of heat in this manner and the pressure exerted by the tongues against the end portions 20 and 21 accomplish a superior shrinking of the end portions of the scams onto the container. Also the tongues 119 and 119a have a mechanical function in that they urge the seam or overlap portion of the film 16 inwardly against the container as shown in FIGS. 14B and 14C. The term "overlap" in this context means the area where the trailing end of the film overlaps the leading end. It will be understood that the tongues 119 and 119a are juxtaposed to this overlap by reason of the design of the machine. Referring to FIGS. 5 and 7, the chucks 110 and 110A are positively driven by the gears 90, 113 and 90a, 113a (see FIG. 7); and the design is such that when a container reaches station D and the leading end of a film segment is applied to a container, the tongues 119 and 119a are in alignment with the leading end, therefore are in alignment with the seam or overlap at stations E and F (see FIG. 5).

At the conclusion of this operation, the tongues, chucks, etc., are, of course, returned to their starting positions.

The embodiment shown in FIGS. 14A, 14B and 14C has been found preferable where the film material, e.g. foam, has heat shrinking characteristics such that the trailing end 44 tends to part from the leading end 45 with the result that an unsightly or esthetically displeasing margin or margins are formed. I have found that by shielding the overlap portions at the seam 43 and by pressing the overlap portions against the container shoulder and bottom curved portions by means of the tapered tips 120 and 120a will accomplish a neater shrinking of the upper and lower edges of the film onto the container.

Figure 15:
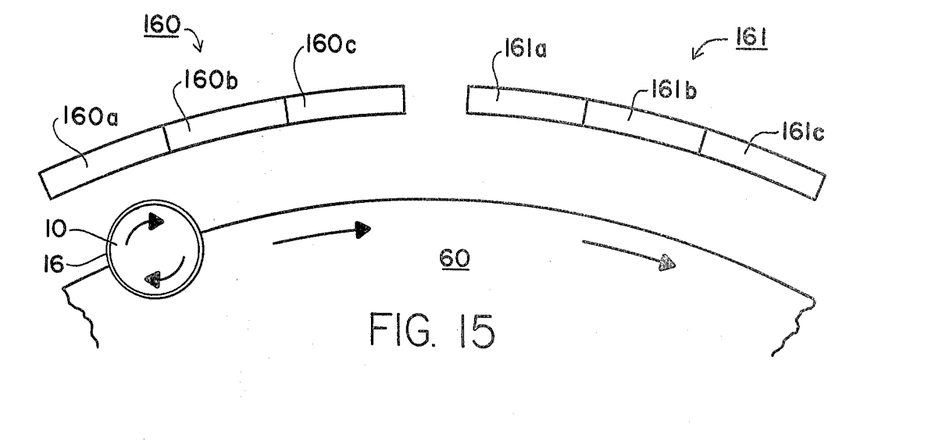
FIG. 15 is a fragmentary diagrammatic view of a preferred embodiment of the heat applicator section of the apparatus. The section shown corresponds to station F of FIG. 5.
Figure 16:
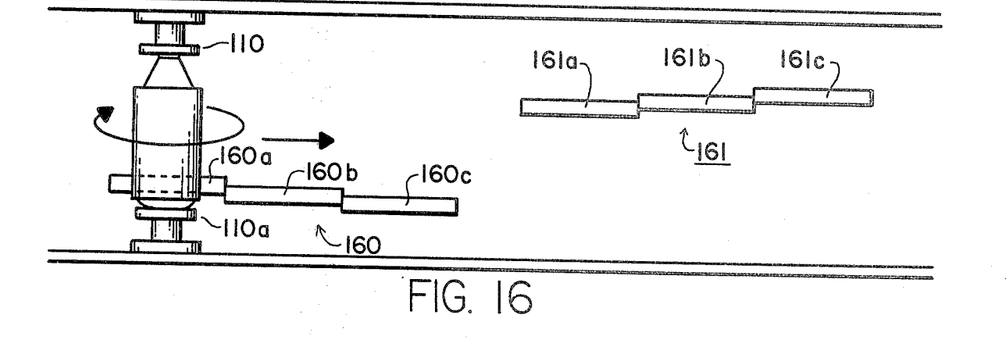
FIG. 16 is a view in elevation of the section shown in FIG. 15 such being shown in planar projection.
Figure 17:
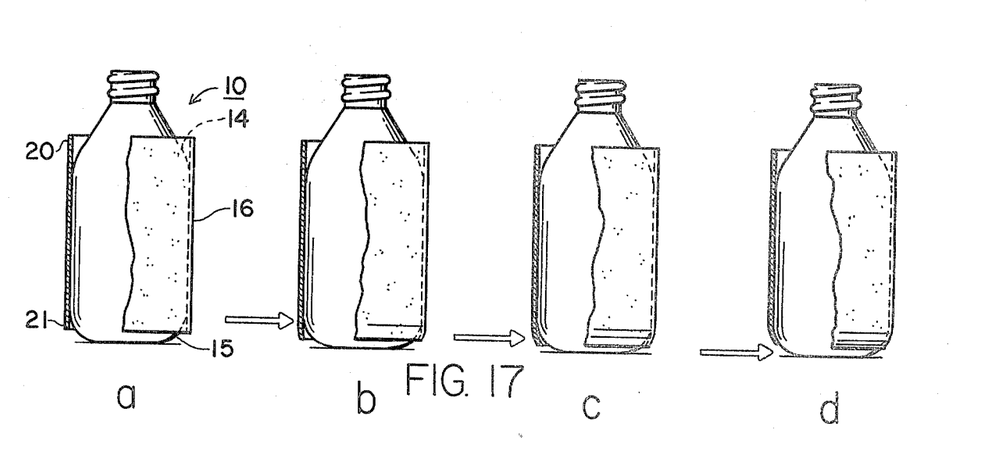
FIG. 17 shows successive stages in the heat shrinking operation at the section shown in FIGS. 15 and 16.

Referring now to FIGS. 15, 16 and 17, a preferred embodiment of the invention at the heat shrinking station F is illustrated. A portion of turret 60 is shown and a container 10 with a label 16 applied thereto is also shown. Omitted from FIG. 15 but shown diagrammatically in FIG. 16 are the chucks 110 and 110a and other associated equipment which is shown in FIG. 7.

Heater assemblies 160 and 161 are provided for shrinking the lower overlap 21 and the upper overlap 20, respectively. The assembly 160 comprises three heaters 160a, 160b and 160c which, as shown in FIG. 16, are arranged at different elevations, the heater 160a being at the highest elevation, the heater 160b somewhat lower and the heater 160c being at the lowest elevation. Heater assembly 161 similarly comprises three heaters 161a, 161b and 161c which are arranged at different elevations as shown. The heaters are preferably of the blower type in which a current of air created by release of compressed air is heated by an electric heating element. The speed of the air may be controlled by a valve and the degree of heat may be controlled by a rheostat.

Referring to FIG. 17, containers are shown at four different positions in their travel past heater assembly 160. The container at left is shown approaching the heater assembly; the next container is shown opposite heater 160a; and the last container is shown opposite heater 160c. The heater 160a directs heat against the film 16 at a level just above the overlap 21, that is to say at approximately the junction of the overlap and the main body portion of the film. The heater 160b directs heat against the upper portion of the overlap 21 and the heater 160c directs heat against the lower portion of the overlap 21. The arrows indicate the direction of flow of hot air from the heaters 160a, 160b and 160c. Meanwhile the container will be spinning and will have spun at least one revolution while passing each of the heaters 160a, 160b and 160c. The effect of this procedure is as shown in FIG. 17. That is, the heat shrinking of each lower overlap 21 starts at the top and proceeds downwardly with the result that air is squeezed out and a tight, bubble free bond is effected between the film and the rounded lower portion 15 of the container.

A similar procedure occurs at the upper overlap 20 as the container passes the heaters 161a, 161b and 161c. That is to say, the overlap 20 will be shrunk by heater 160a at approximately the junction of the overlap 21 and the main body portion of the film, then shrinking will occur upwardly of this level and finally the edge of the overlap 21 will be shrunk onto the rounded portion 14 of the container thereby accomplishing the same effect as described above with reference to the heaters 160a, 160b and 160c.

The tongues 119 and 119a are not shown in FIGS. 15, 16 and 17 but they are preferably employed as in FIGS. 14a, 14b and 14c.

The heater assemblies 160 and 161 are shown in sequence with the assembly 160 preceding the assembly 161. This order may be reversed and the assembly 160 and 161 may be in vertical alignment. However, a spacing between them is preferred as shown because it has a lesser tendency to overheat the film and the containers, and in particular the glue line applied at the seam of the film. That is, by the time a container and film reach heater assembly 161 much of the heat applied by the preceding heater assembly 160 will have been dissipated.

The seam at the overlap of freestanding edge (or edges) of the film may have glue applied to it but such is unnecessary.

Another advantage of the apparatus of the present invention is that the input of heat can be regulated for best results. Where, as in the embodiment described above, heat is applied by means of hot air the rate of energy input can be controlled by controlling the speed of the air and the temperature of the electric heater. The optimum rate of heat or energy input will depend upon a number of factors such as the size and material of the containers, the characteristics of the heat shrink film and the characteristics of the hot melt glue. These factors will remain constant or nearly constant for a considerable period of time. However, a variable factor is the speed of the machine which depends upon a number of conditions such as the supply of containers, the demand for labeled containers, difficulties in other parts of the production line, etc.

In the system described above with reference to U.S. Pat. No. 3,822,459 it is difficult to adjust the energy input. The present invention enables rapid and, where needed, frequent adjustment of energy input by adjustment of the temperature of the electric heater and by adjustment of the rate of release of compressed air. Further, these adjustments can be synchronized with the speed of the machine. Thus the speed of the drive shaft 81 (see FIG. 7) can be synchronized with the speed of the air and the temperature of the electric heaters. If for some reason it is necessary to slow down the operation of the machine, it is also advantageous to slow down the rate of input of heat because overheating may have an adverse effect upon the film and more particularly upon the glue at the overlapping seam. If for some reason the speed of the machine is reduced the speed of the air and/or the temperature of the electric heaters can be diminished rapidly and instantly. Similarly if it is desired to speed up the machine then it will be necessary to increase the rate of heat input because each container's transit past the heaters will be of shorter duration. This increase of rate of heat input can be readily and instantly carried out. As noted above, this can be coordinated with the speed of the drive shaft 81.

Figure 18:
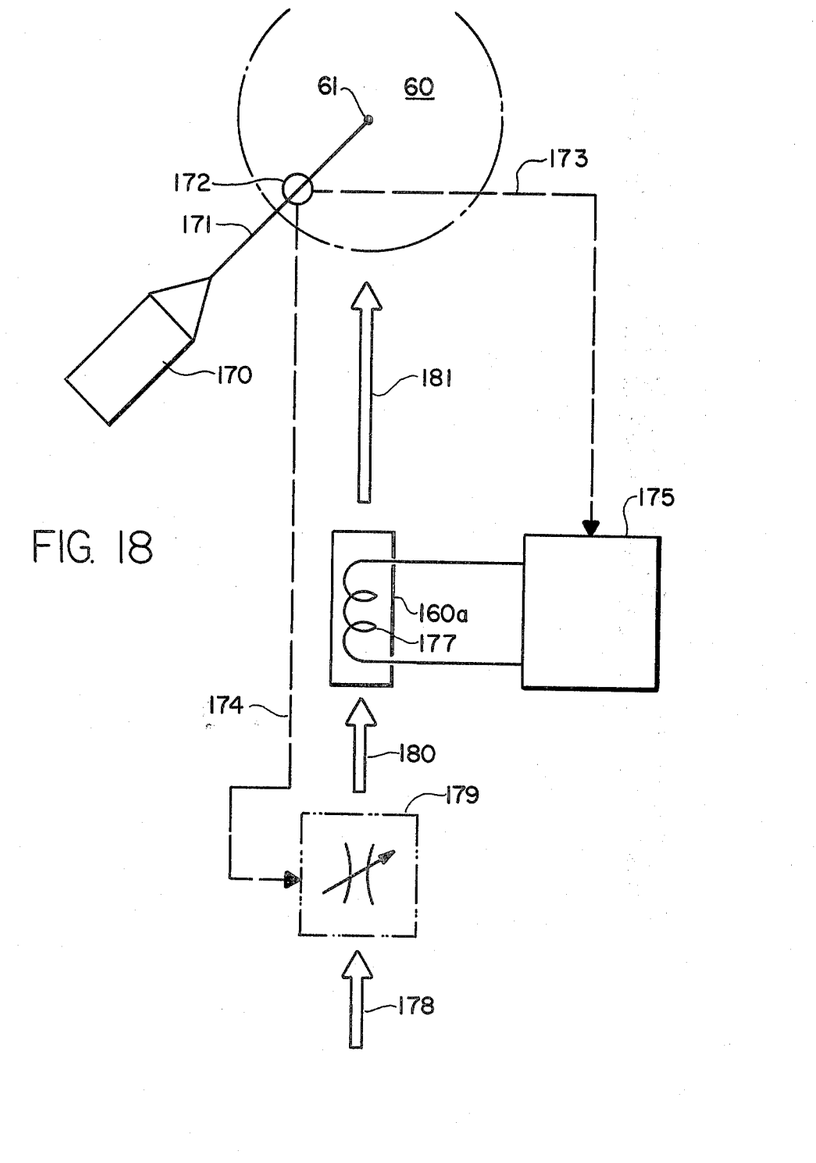
FIG. 18 is a diagrammatic view of a control system for control of the heater assemblies shown in FIGS. 15 and 16.

Referring now to FIG. 18 a control system for the heater assemblies 160 and 161 is shown. A main motor and speed reducer 170 drives, through a connection indicated at 171, the shaft 61 of turret 60. A microprocessor or other suitable control device 172 senses the speed of the shaft 61 and through suitable connections 173 and 174 controls temperature controller 175 and air flow controller 176, respectively. A heater assembly 160a is shown which has an electric resistance element 177 which is controlled by controller 175. Compressed air from a suitable source (not shown) enters through line 178 into air flow controller 176 which is variable and reduces the pressure, hence the velocity, of air passing through line 180 to heater 160a. Heated air passes through nozzle 181 and is applied to the overlaps 21. Only one heater 160a is shown but it will be understood that the control system shown may be used to control heaters 160 a, b and c and 161 a, b and c or that a separate control system may be used for each heater, or for any selected group of heaters.

It will therefore be apparent that a new and improved apparatus and a new and improved method of applying heat shrink film to containers and the like have been provided.

I claim:

1. A method of applying heat shrinkable film to an article having a main, vertical body portion and at least one end portion which curves inwardly from the main body portion, said method comprising:
   (a) tightly applying such film to the body portion of the article without heat shrinking by adhering the leading end of the film to the body of the article, wrapping the film about the body, lapping the trailing end of the film over and adhering it to the leading end to form a side seam and also allowing a small overlap of the film over at least one such end portion,
   (b) providing an extensible-retractable tongue or tongues, extensible to and retractable from a heat shielding position wherein it acts as a heat shield between an exterior source of heat and said side seam,
   (c) cyclicly operating such extensible-retractable tongue(s) to extend it to the heat shielding position and thereafter retracting it, and
   (d) applying heat from an external source to predominantly said small overlap to shrink it onto the article while said tongue is in extended position.

2. The method of claim 1 wherein the trailing end of the film is adhered to the leading end by an adhesive.

3. The method of claim 2 wherein the adhesive is a hot melt glue.

4. The method of claim 1 wherein the container has two (an upper and a lower) inwardly curving end portions, both ends of the film are heat shrunk onto the container during step (d) and an extensible-retractable tongue is interposed between each source of heat and each end of the film during such heat shrinking.

5. The method of claim 1 wherein the tongue or tongues are also used to urge the overlap or overlaps against the container.

6. The method of claim 1 wherein said wrapping is accomplished by spinning each article about the longitudinal axis of its body portion when and after the leading end of the film is adhered to the article.

7. The method of claim 6 wherein the body of the article is cylindrical.

8. The method of claim 7 wherein the article is a container.

9. The method of claim 1 wherein heat is applied in the form of a current of hot air.

10. A continuous method of applying heat shrinkable film to containers which comprises:
   (a) providing a continuous supply of such film
   (b) continuously severing the film into segments of the desired length
   (c) continuously transporting the severed segments to a film applicator station
   (d) continuously applying the segments of film at the applicator station to containers each of which has a main body portion having an upper end and a lower end and presenting a surface which is vertically linear and having also at least one end portion adjoining the body portion and curving inwardly therefrom, and causing at such applicator station the leading end of each segment of film to be applied to the main body portion of a container without heat shrinking it by spinning the container about its cylinder-axis, adhering the trailing end to the leading end by means of an adhesive thereby forming a side seam and also forming on each container at least one overlapping portion overlapping an end portion of the container but unattached thereto
   (e) providing an extensible-retractable tongue, extensible to and retractable from a heat shielding position wherein it acts as a heat shield between an exterior source of heat and said side seam,
   (f) cyclicly operating such extensible-retractable tongue to extend it to the heat shielding position and thereafter retracting it, and
   (g) applying heat from an external source to predominantly said end portion to shrink it onto the container while said tongue is in extended position.

11. The method of claim 10 wherein the containers are cylindrical and are transported continuously in a circular path from a container input station to a container output station, the containers are caused to spin about their longitudinal axes during such transport, the leading end of each segment of film is applied by means of an adhesive to each container at a label applying station located in said circular path and is wrapped around the container by reason of the spinning motion of the container and heat is applied to the resulting overlap or overlaps of the applied segment of film to heat shrink the same onto the container.

12. Apparatus for continuously applying heat shrink film to containers having a cylindrical body portion and at least one end portion curving inwardly from the body portion said apparatus comprising:
   (a) a film feed for continuous supply of film material from a roll thereof
   (b) a continuous cutting assembly acting to sever segments of film from such supply
   (c) a continuously rotating vacuum drum serving to grip the leading end of each severed segment of film, to adhere to an applicator station and to release the segment at such station
   (d) a continuous container transport serving to transport containers continuously to said applicator station and then to a heating station
   (e) means for wrapping each segment of film about and adhering it to the body portion of each container without heat shrinking the same and forming a side seam in the form of an overlapping, adhesively secured bond between the leading and trailing ends of the segment and also forming an overlap of the segment opposite and unattached to at least one such end portion (f) heating means external to the film acting to apply heat to predominantly the overlap or overlaps to heat shrink them onto the container and (g) an extensible-retractable tongue extensible to and retractable from a heat shielding position wherein it acts as a heat shield between an external source of heat and said side seam, (h) means cyclicaly operating such extensible-retractable tongue to extend it to the heat shielding position and thereafter retracting it, and (i) means for operating said heating means to apply heat to predominantly such overlap during the period that said tongue is in extended position.

13. The apparatus of claim 12 wherein said tongue also serves to urge the overlap against the container.

14. Apparatus for wrapping segments of heat shrinkable sheet material around articles, such articles having a cylindrical body and at least one end portion adjoining the body and sloping inwardly therefrom, said segments having a length greater than the circumference of the body to allow the segment to be wrapped around the body with an overlap sufficient to form a seam, said segments having a width greater than the length of the body such that, when the segment is wrapped around the body, an edge portion of the segment will overlap at least one sloping end portion and will stand free, said apparatus comprising:

(a) an article transport adapted to transport such articles in sequence to an applicator station with the body of each article accessible (b) a segment transport adapted to transport such segments in sequence to said applicator station with the leading end of each segment tangent to the body of the respective container (c) means for adhesively securing such leading end to the body of the respective container by compressing the leading end between the container and the segment transport (d) means for then spinning the article about its cylindrical axis (e) means serving during such spinning to wrap the segment about the body, (f) means tangent to the body of the article serving to apply pressure to the overlapping ends of the segment to adhesively secure the trailing end to the leading end of the segment, (g) an extensible-retractable tongue extensible to and retractable from a position wherein it acts as a heat shield between an exterior source of heat and said seam (h) means cyclically operating such extensible-retractable heat shield means to extend it to heat shielding position and thereafter retracting it, and (i) means for applying heat from an external source to predominantly such edge portion or portions during the period that said heat shield means is in extended position.

15. The apparatus of claim 14 wherein said heat shield means has a tapered end portion which serves to apply pressure to the edge portion or portions as it is extended thereby urging such edge portion or portions toward the end portion or portions of the article.

16. The apparatus of claim 14 wherein said article transport is in the form of a rotary member rotating about a fixed axis and which includes a plurality of opposing pairs of rotary chucks for gripping opposite ends of the article and spinning the same about their cylindrical axes as they move orbitally around said fixed axis.

17. The apparatus of claim 16 wherein said segment transport is in the form of a rotary vacuum drum serving to pick up segments on its surface at a segment pickup station, to hold each segment on its surface during rotation, to apply pressure against the leading end of the segment at said applicator station and to release the segment to the container at said station.

* * * * *